United States Patent
Grandi (10) Patent No.: US 10,036,352 B2
(45) Date of Patent: Jul. 31, 2018

(54) FLUID INJECTOR, COMBUSTION ENGINE AND METHOD FOR OPERATING A COMBUSTION ENGINE

(71) Applicant: CONTINENTAL AUTOMOTIVE GMBH, Hannover (DE)

(72) Inventor: Mauro Grandi, Leghorn (IT)

(73) Assignee: Continental Automotive GmbH, Munich (DE)

( * ) Notice: Subject to any disclaimer, the term of this patent is extended or adjusted under 35 U.S.C. 154(b) by 0 days.

(21) Appl. No.: 15/288,895

(22) Filed: Oct. 7, 2016

(65) Prior Publication Data

US 2017/0101965 A1    Apr. 13, 2017

(30) Foreign Application Priority Data

Oct. 9, 2015 (EP) .................................... 15189170

(51) Int. Cl.
  *F02M 51/06* (2006.01)
  *F02M 21/02* (2006.01)

(52) U.S. Cl.
  CPC .... *F02M 21/0254* (2013.01); *F02M 21/0215* (2013.01); *F02M 51/0614* (2013.01)

(58) Field of Classification Search
  CPC .......... F02M 21/0218; F02M 21/0248; F02M 21/0257; F02M 21/0254; F02M 21/0215; F02M 51/0614
  USPC ................................................ 123/490, 525
  See application file for complete search history.

(56) References Cited

U.S. PATENT DOCUMENTS

| | | | | |
|---|---|---|---|---|
| 6,267,306 B1* | 7/2001 | Phillips | ............... | F02M 47/027 239/127 |
| 6,856,222 B1* | 2/2005 | Forck | .................. | F02M 47/027 335/265 |
| 8,434,457 B2* | 5/2013 | Coldren | .............. | F02M 53/043 123/41.31 |
| 8,844,842 B2* | 9/2014 | Kim | ...................... | F02M 43/04 123/27 GE |
| 8,967,502 B2* | 3/2015 | Kim | ................... | F02D 19/0684 123/27 GE |
| 9,453,483 B2* | 9/2016 | Kim | ..................... | F02M 63/008 |

(Continued)

FOREIGN PATENT DOCUMENTS

| | | |
|---|---|---|
| DE | 102012021154 | 4/2014 |
| DE | 102013205624 A1 | 10/2014 |

(Continued)

OTHER PUBLICATIONS

European Search Report for EP priority application 15189170.2, European Patent Office, dated Mar. 18, 2016.

(Continued)

*Primary Examiner* — Hai Huynh (57) ABSTRACT

A fluid injector for a combustion engine is disclosed, including an injector housing having a fluid path wherein the fluid path extends along a longitudinal axis from an injector inlet to an injector outlet; a coil; a pole piece; a first valve adapted to act on the fluid path and having a first armature; a second valve adapted to act on the fluid path and having a second armature. The first armature and the second armature are arranged proximate to the pole piece on antipodal sides of the pole piece along a longitudinal direction.

20 Claims, 5 Drawing Sheets

(56) References Cited

U.S. PATENT DOCUMENTS 9,624,845 B2 * 4/2017 Kim .................... F02D 19/0615
2016/0053734 A1 2/2016 Schuele

FOREIGN PATENT DOCUMENTS

DE 102013222030 A1 4/2015
EP 1288487 A2 3/2003

OTHER PUBLICATIONS

European Examination Report for EP priority application 15189170.2, European Patent Office, dated Nov. 9, 2017.

\* cited by examiner

FLUID INJECTOR, COMBUSTION ENGINE AND METHOD FOR OPERATING A COMBUSTION ENGINE

CROSS-REFERENCE TO RELATED APPLICATION

This application claims priority, under 35 U.S.C. 119, to European patent application EP15189170.02, filed Oct. 9, 2015, the content of which is hereby incorporated by reference herein in its entirety.

TECHNICAL FIELD

The present invention refers to a fluid injector for injection of a fluid, in particular for direct injection (DI) of compressed natural gas (CNG) into a combustion chamber of combustion engine. The invention further refers to a combustion engine comprising a cylinder and a fluid injection valve being coupled to the cylinder in a manner capable for direct injection of a fuel fluid into the combustion chamber of the cylinder. The invention also comprises a method of operating such a combustion engine.

BACKGROUND

In the prior art of fluid injectors, also called fluid injection valves, it is known for a first valve and a second valve to act on the same fluid path. For example, reference is made to German patent application DE 10 201 3 222 030 A1. In such fluid injectors, which may be used for direct injection of a fuel gas into the combustion chamber of a combustion engine, its two valves must be operated contemporaneously. CNG-DI fluid injectors, i.e., fluid injectors which are used for direct injection of compressed natural gas, should have a "zero" tip leak, which cannot be achieved with standard metal-to-metal sealing. In order to achieve a good sealing against gas, an elastomeric material is preferred. However, elastomeric materials do not withstand the injector tip temperatures which are typical at the inside of a combustion chamber. For this reason, an elastomeric material is placed away from the combustion chamber in a "cold valve." The other valve (the "hot valve") is placed at the fluid injector inside the combustion chamber. The hot valve, which may have an injector design of the outward opening type, is required to keep the injector tip closed against the combustion pressure. The cold valve is required to achieve the intended "zero" tip leak in cooperation with the hot valve.

In those fluid injectors comprising a first valve and a second valve in the same fluid path, there is a need to control both valves. To operate the valves, it is known that the fluid injector comprises a solenoid, i.e., a pole piece which is surrounded by a coil, and an armature which is coupled to a valve and which may be attracted and moved towards the pole piece if the coil is energized by electric current. German patent application DE 10 201 3 222 030 A1 discloses a fluid injector wherein one solenoid is used to control the first valve and the second valve simultaneously. However, because the hot valve is of the outward opening type, this requires that also the cold valve is of the outward opening type which may be disadvantageous in case of a system failure mode when, for example, gas is delivered to the injector with a not controlled too high pressure.

As to other fluid injectors comprising a cold valve of the inward opening type, it has been proposed to apply two solenoids which can independently operate the inward valve and the outward valve. However, such fluid injectors are unsatisfying because of its complex and costly structure and because for controlling each of the both solenoids it is needed a dedicated power stage in the injector driver unit inside the engine control unit (ECU). In case two solenoids are required, this also means that two power stages for the individual injectors are required. If, in another design, two coils are used for pulling two armatures in the same direction (i.e., for a serial design) to increase the solenoid maximum force, a complex and expensive structure results which implies additional design difficulties for the controlling functions of both, hardware and software, of a CNG-DI injection system.

SUMMARY

Regarding these disadvantages it is an object of the invention to provide an improved fluid injector. In particular, an aspect of the invention is that by such improvement, the known disadvantages are reduced or removed as far as possible.

An embodiment of the present invention provides a fluid injector, in particular for direct injection of compressed natural gas into a combustion chamber of a combustion engine, wherein the fluid injector comprises: an injector housing including a fluid path wherein the fluid path extends along a longitudinal axis from an injector inlet to an injector outlet, a coil, a pole piece, a first valve adapted to act on the fluid path and comprising a first armature, and a second valve adapted to act on the fluid path and comprising a second armature, wherein the first armature and the second armature are arranged proximate to the pole piece on opposite sides of the pole piece, in particular on antipodal sides of the pole piece along the longitudinal direction. This means that in an embodiment, the fluid injector preferably comprises only one coil and only one pole piece which are used to control the first valve and the second valve. In other words, in such an embodiment the coil and the pole piece can be considered to belong to the first valve and to the second valve, respectively. Because the first armature and the second armature are arranged on antipodal sides of the pole piece with regard to the longitudinal direction, the pole piece can be used to attract, i.e., to move, the first armature and the second armature in opposite directions by energizing the coil which results in a magnetic force of attraction between the pole piece and the first armature and a magnetic force of attraction between the pole piece and the second armature. The pole piece and the armatures may be made of any material appropriate for the described purpose, for example, a metal like steel or the like. In such an embodiment, the first valve is adapted to act on the fluid path which means that the first valve is adapted to selectively open or close the fluid path depending on the intended operational state. Also, the second valve is adapted to act on the fluid path, i.e., to selectively open or close the fluid path depending in the intended operational state of the fluid injector.

Hence, the fluid injector, according to embodiments of the invention, is able to directly control two valves with an opposite moving direction of its armatures by using only one solenoid circuit. Accordingly, the fluid injector, according to the embodiments of the invention, requires only one driver signal to operate the single solenoid circuit.

In a preferred embodiment, the solenoid magnetic circuit comprises one housing, one coil, one pole piece and two armatures. The two armatures may apply forces in opposite directions. A first armature may be used to open a hot valve of the outward opening type, while a second armature may be used to open a cold valve of the inward opening type.

A fluid injector, as described above, may provide different advantages. Preferably one coil, the first armature and the second armature are adapted to operate the first armature and the second armature by supplying one electrical signal to the coil. Accordingly, both armatures can operate with one coil and one electrical signal. By means of one single solenoid circuit, it is possible to control the movement of two valves in opposite directions, preferably one in an inward direction and the second in an outward direction. By means of the proposed fluid injector, a valve movement (i.e., lift) can be different between the first valve (for instance, of the outward opening type) and the second valve (for instance, of the inward opening type). Because a single solenoid is used instead of two solenoids, the product costs may be reduced and the product design may be significantly simplified. Furthermore, the system control functions may be simpler if only one solenoid is actuated and controlled. Furthermore, the hardware may be simpler and cheaper because to control one solenoid, it is needed a dedicated power stage in the injector driver unit inside the ECU. In case two solenoids are used, consequently two power stages for each individual injector are required. A fluid injector, according to embodiments of the invention, may support the product functions development with simplified injector and system hardware, in comparison with traditional solutions where two solenoids are used. The fluid injector, according to the embodiments of the invention, allows the possibility of having different armature magnetic gaps with the pole piece and each armature can be submitted to a different spring load. With this combination of factors, it is possible to predefine which armature opens and closes sooner with respect to the other armature. In addition to this flexibility, also each armature axial gap position, with respect to the center of the coil height, can define a delay in opening and closing.

It is preferred that the first valve comprises a first sealing seat and a first closing member, wherein the first closing member is connected to the first armature, and the second valve comprises a second sealing seat and a second closing member, wherein the second closing member is connected to the second armature, wherein the second closing member is disposed upstream to the first closing member in the fluid path direction and wherein the first closing member is disposed at the injector outlet. Preferably the second sealing seat is provided by an axial end of the injector housing. In an embodiment, the first valve is an outward opening valve and the second valve is an inward opening valve. Hence, the first valve may be the hot valve and the second valve may be the cold valve. The inward opening design for the cold valve supports the function of keeping the injector closed in case of a system failure mode which can deliver gas to the injector with a not-controlled-too-high pressure value. Accordingly, although the hot valve may be an outward opening valve, a fluid injector according to the embodiment can support in a safe way a failure mode where excessive gas/fuel supply pressure values are reached (i.e., the system failure mode).

It is preferred that the first armature is located axially between the injector inlet and the pole piece and that the second armature is located axially between the pole piece and the injector outlet. In an embodiment, it is provided that at least one of the first sealing seat and the first closing member of the outwardly opening valve is metallic or comprises a metallic element. The second sealing seat and/or the second closing member may be soft or comprises a soft element (for example, made of soft rubber). Accordingly, a fluid injector, according to the embodiment, can be manufactured not only with metallic, and in particular with stainless steel components, but also with, for example, plastic or rubber based components or the like. It is preferred that at least one of the second sealing seat and the second closing member is elastomeric or comprises an elastomeric element.

In an embodiment, the first valve comprises an axially compressed spring for pressing the first armature in a direction away from the pole piece. By setting a proper spring load and setting different axial gaps between the first and second armatures and the pole piece, it is possible to determine and synchronize which armature will start its movement sooner with respect to the other since both are part of the same magnetic circuit in which the closest armature to the pole piece will start the movement sooner. By means of directly driving the outward opening valve, it is possible to apply a sufficient spring load to keep the valve closed and to prevent an unwanted and uncontrolled gas release in the combustion chamber especially during the intake phase or during the discharge phase. It is possible that between the pole piece and the first armature, there is axially clamped a compression spring (for example, a wave spring). It is possible that between the pole piece and the second armature, there is axially clamped a compression spring (for example, a wave spring).

In an embodiment, the first valve comprises a valve needle, the first armature is axially fixed to the valve needle and the valve needle extends through a central opening of the pole piece and through an opening of the second armature. It is preferred that the second valve comprises an armature holder, that the armature holder has a bottom and a wall, that the wall extends around a cavity, wherein one axial end of the wall is axially fixed to the second armature and the other axial end of the wall is, in particular, integrally connected to the bottom, that the bottom has a central through-hole, the valve needle extends through the through-hole and an edge of the through-hole is connected to the valve needle by an elastic bellow, which in particular is mounted axially compressed in a sealing manner. Instead of an elastic bellow, another kind of elastic sealing may be used. The before-mentioned sealing connection may be achieved preferably by a first laser weld sealing connecting the elastic bellow at its first axial end to the valve needle, and by a second laser weld sealing for connecting the other axial end of the bellow to the armature holder or to an intermediate part (for example, an adapter) which may be connected to the armature holder by an additional laser weld sealing, for example. The bellow may connect the valve needle with an internal surface of the armature holder in order to prevent a gas delivery which can be uncontrolled by the sealing of the second valve (which preferably comprises an elastomeric sealing). Accordingly, the bellow may block unwanted gas/fuel delivery to the first sealing seat. As an alternative to the laser weld sealings, the connection of the bellow can, for example, be made by O-ring connections or the like to prevent gas delivery through this area.

It is preferred that in a de-energized state of the coil, there is a first axial gap between the pole piece and the first armature and a second axial gap between the pole piece and the second armature. It is possible that, for example, the first gap has a different axial extension compared to the second gap. By means of different axial gaps, i.e., distances, between the pole piece and the armatures, it is possible to anticipate the movement of one armature with respect to the other. It is possible that in a de-energized state of the coil, for example, an amount of a first axial force generated by a spring is different from an amount of a second axial force generated by the elastic bellow.

Further, in order to overcome the known disadvantages of prior fluid injectors, an aspect of the invention provides a combustion engine, comprising a cylinder and a fluid injection valve being coupled to the cylinder in a manner capable for direct injection of a fuel fluid into the combustion chamber of the cylinder, wherein the fluid injection valve is a fluid injection valve which comprises one or more of the above described features. It is preferred that the inlet of the fluid injection valve is coupled to a fluid source of compressed natural gas.

Further, a method of operating a combustion engine comprises providing a combustion engine having one or more of the above described features, and using the fluid injection valve for injecting fluid, in particular for injecting CNG directly into the combustion chamber. Preferably, the first armature and the second armature are operated by supplying one electrical signal to one coil.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

Exemplary embodiments of the invention are explained in the following with regard to the attached figures. The figures show:

FIG. 1 a is an enlarged view of details of area la in FIG. 1;

FIG. 1b is an enlarged view of details of area la in FIG. 1, wherein an intended fluid path and an unintended fluid path are schematically indicated;

DETAILED DESCRIPTION OF EMBODIMENTS

Figure 1:
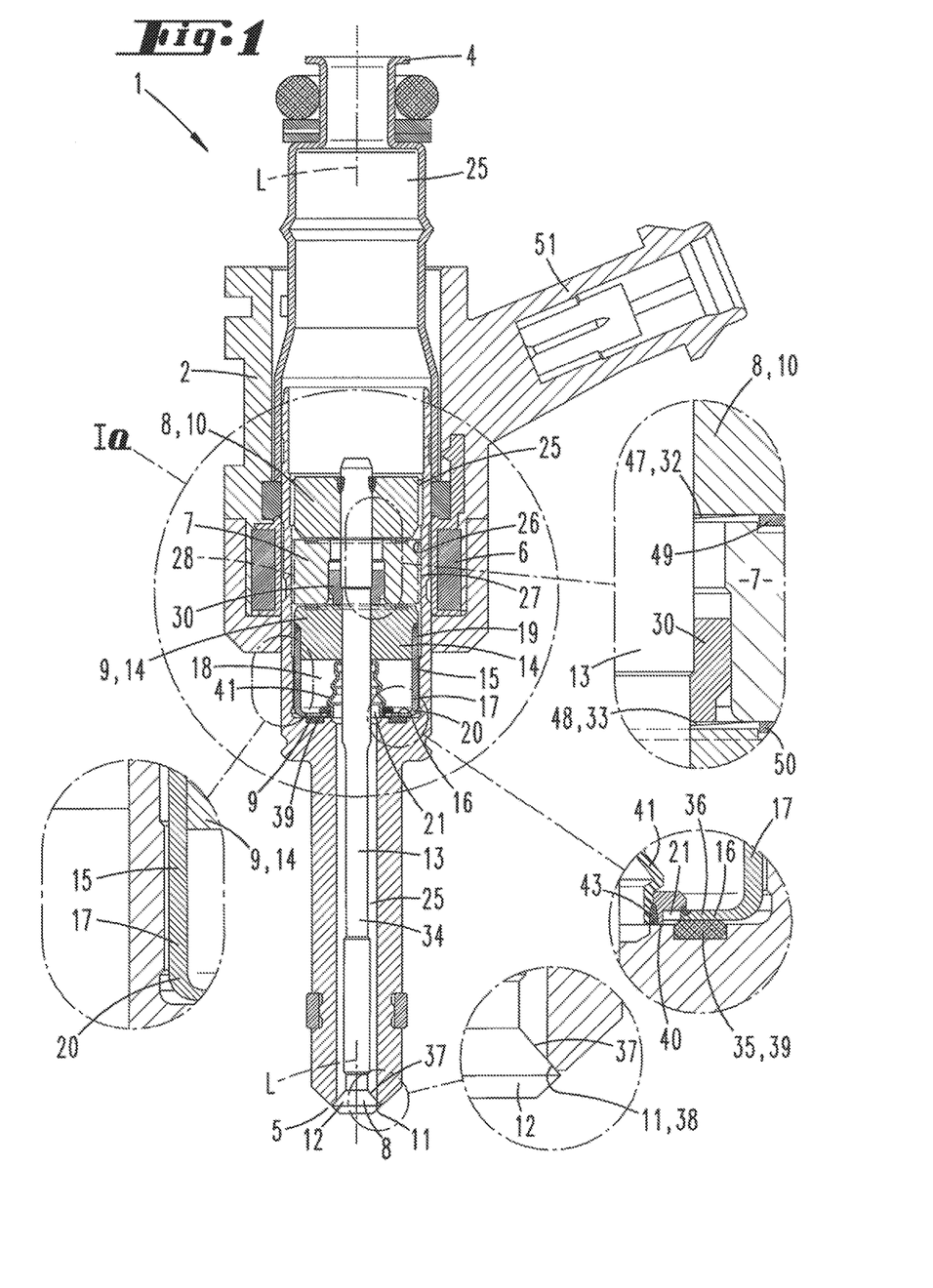
FIG. 1 is a sectional view of an exemplary embodiment of a fluid injector in a closed operation state.

FIG. 1 shows an exemplary embodiment of a fluid injector 1 according to the present invention. FIG. 1 represents an operating state where the fluid injector 1 is closed. The shown fluid injector 1 can be used for direct injection (DI) of compressed natural gas (CNG) directly into a combustion chamber (not shown in the figures) of a combustion engine. The fluid injector 1 comprises an injector housing 2 which is composed of some components. The injector housing 2 includes a fluid path 3 schematically indicated in FIG. 1b. The intended fluid path 3 extends along a longitudinal axis L from an injector inlet 4 to an injector outlet 5. The fluid injector 1 comprises a coil 6 and a pole piece 7 which are both axially fixed (i.e., fixed in an axial direction parallel to the longitudinal axis L, which means that the coil 6 and the pole piece 7 are not axially moveable relative to the injector housing 2) at the injector housing 2. As it is known by those skilled in the art, the pole piece 7 is magnetically polarized when the coil 6 is energized by applying an electrical current thereto. The fluid injector 1 further comprises a first valve 8 which is capable of closing the fluid path 3 if the coil 6 is de-energized and opening the fluid path 3 if the coil 6 is energized. Furthermore, the fluid injector 1 comprises a second valve 9 which is also capable of closing the fluid path 3 if the coil 6 is de-energized and opening the fluid path 3 if the coil 6 is energized. Accordingly, the valves 8, 9 are adapted to act on the fluid path 3. The first valve 8 comprises a first armature 10, a first sealing seat 11, a first closing member 12 and a valve needle 13. The first armature 10 is fixed, for example, welded (for example, by laser welding), adhered or the like to the valve needle 13 in a manner capable for transmission of an axial force. The first closing member 12 is integrally formed at the opposite axial end of the valve needle 13 and its respective first sealing seat 11 is formed by a surrounding axial end of injector housing 2.

The second valve 9 comprises a second armature 14 and an armature holder 15 which has a cup-like form comprising a bottom 16 and a wall 17. The wall 17 circumferentially extends around the longitudinal axis L by surrounding a cavity 18. The wall 17 has an axial end 19 facing the pole piece 7 and being axially fixed to the second armature 14. The term "axially fixed" in this context means a connection which is capable for transmission of axial forces typically arising during operation of the fluid injector 1 so that because of the fixation, the armature holder 15 cannot move in axial direction (i.e. parallel to the longitudinal axis 11) relative to the armature 14. The fixation, for example, may be a laser weld. The opposite axial end 20 of the wall 17 is integrally connected to the bottom 16. The bottom 16 comprises a central through-hole 21.

Figure 1A:
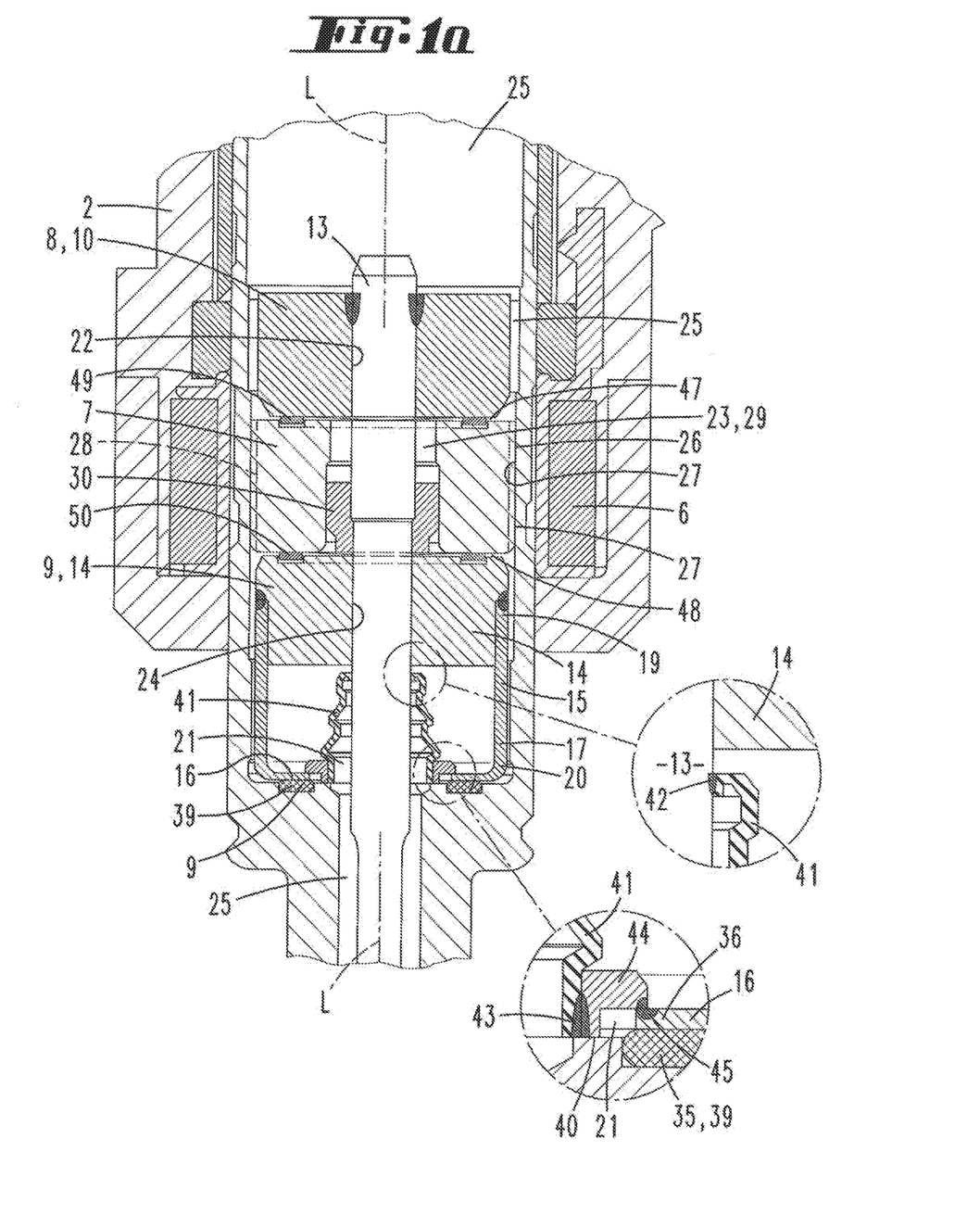

Furthermore, and with reference also to FIGS. 1a and 1b, the first armature 10 encloses a through-hole 22, the pole piece 7 encloses a through-hole 23 and the second armature 14 encloses a through-hole 24. Injector housing 2 encloses a hollow space 25. The pole piece 7 is axially connected to an inner surface 27 of the injector housing 2 facing the hollow space 25, i.e., the pole piece 7 is connected in a manner suitable to withstand axial forces in a range typical for the operation of the fluid injector 1. The connection may be, for example, a press fit, a welding connection, an adhesive bond or any other suitable connection. On the other hand, the first armature 10 and the second armature 14 with the armature holder 15 are accommodated in the hollow space 25 and axially moveable relative to injector housing 2. In the shown embodiment, the outside diameters of the first and second armatures 10, 14 and of the armature holder 15 are somewhat smaller compared to the diameter of the hollow space 25. On the other hand, for providing a connection between the pole piece 7 and the injector housing 2 which is suitable to withstand axial forces, an outer surface 26 of the pole piece 7 contacts the inner surface 27 of the injector housing 2. However, in order to enable an unbroken axial fluid path 3 (FIG. 1b), pole piece 7 may have one or more axially extending grooves 28 embedded in its surface 26 (indicated by dashed lines) or, for example, may have one or more axially extending through-holes (not shown). In the embodiment, an inner diameter of pole piece 7 is bigger compared to the diameter of the valve needle 13 so that a ring-shaped space 29 is formed therebetween. Within the space 29, a guidance 30 is accommodated and axially disposed between the second armature 14 and the first armature 10. Axially the between the pole piece 7 and the first armature 10 is disposed a first wave spring 49 which applies a compressive force to the first armature 10 in an axial direction away from the pole piece 7 in order to close the first valve 8. The first wave spring 49 is inserted in a groove in the pole piece 7. Axially between the pole piece 7 and the second armature 14 is disposed a second wave spring 50 which applies a compressive force to the second armature 14 in an axial direction away from the pole piece 7. Wave spring 50 is inserted in a groove of the second armature 14. An inner diameter of the second armature 14 is adapted to the diameter of the valve needle 13 so that the latter is axially moveable relative to the second armature 14. The valve needle 13 passes through the first armature 10, the pole piece 7, the second armature 14, the armature holder 15 and a subsequent section of the injector housing 2. An electrical connector is designated by reference number 51 (FIG. 1).

As shown by the figures, the first armature 10 and the second armature 14 are arranged proximate to the pole piece 7 on antipodal sides 32, 33 of the pole piece 7 along the longitudinal direction L. The first closing member 12 is connected to the first armature 10 by a shaft 34 of the valve needle 13 for transmitting axial forces. As it is clear from the figures, the first valve 8 is of the outward opening type. The first closing member 12 is formed by an axial end area of the valve needle 13 comprising a cone-shaped surface 37 which is coaxial to a cone-shaped surface 38 of injector housing 2 and provides the first sealing seat 11 (FIG. 1) at the axial end area of injector housing 2. In the embodiment, the injector housing 2 and the valve needle 13 are made from metal.

In the embodiment, the second valve 9 comprises a second sealing seat 35 and a second closing member 36. The second sealing seat 35 is provided by a ring-shaped elastomer element 39 (for example, made of soft rubber) which is inserted in an annular groove. The latter is formed at a face of the injector housing 2 axially facing the hollow space 25 at a radial step. The second closing member 36 is provided by the bottom 16 and hence is connected to the second armature 14. From the figures and the above description, it is clear that the second closing member 36 is disposed upstream to the first closing member 12 in the fluid path 3. It is furthermore clear that the second valve 9 is of the inward opening type. The second valve 9 comprises an elastic bellow 41. At its first axial end, the bellow 41 is fixed to the valve needle 13 by a circumferential welding connection 42 (FIGS. 1a and 1b). At its antipodal axial end, the bellow 41 is fixed by means of a circumferential welding connection 43 to a ring-shaped adapter 44 which is fixed by a ring-shaped welding connection 45 to the bottom 16. Welding connections 42, 43, 45 are gas-tight, in order to prevent an unintended fluid path 46 (FIG. 1b). Hence, an edge of the through-hole 21 is connected to the valve needle 13 by the elastic bellow 41 in a gas-tight manner. In the embodiment, the elastic bellow 41 is mounted in an axially compressed state.

From the above description, the function of the fluid injector 1 is clear. In an operational state shown by FIG. 1 when the coil 6 is de-energized, the first wave spring 49 pushes the first armature 10 away from the pole piece 7 in order to close the first valve 8. In this operational state, the first closing member 12 contacts the first sealing seat 11 to close the first valve 8. Further, in the de-energized state of coil 6, the second wave spring 50 pushes the second armature 14 away from the pole piece 7 and the axially compressed bellow 41 pushes bottom 16, i.e., the second armature 14, away from the pole piece 7 so that bottom 16 contacts the elastomer element 39 for closing the fluid path 3 at the second valve 9.

Figure 2:
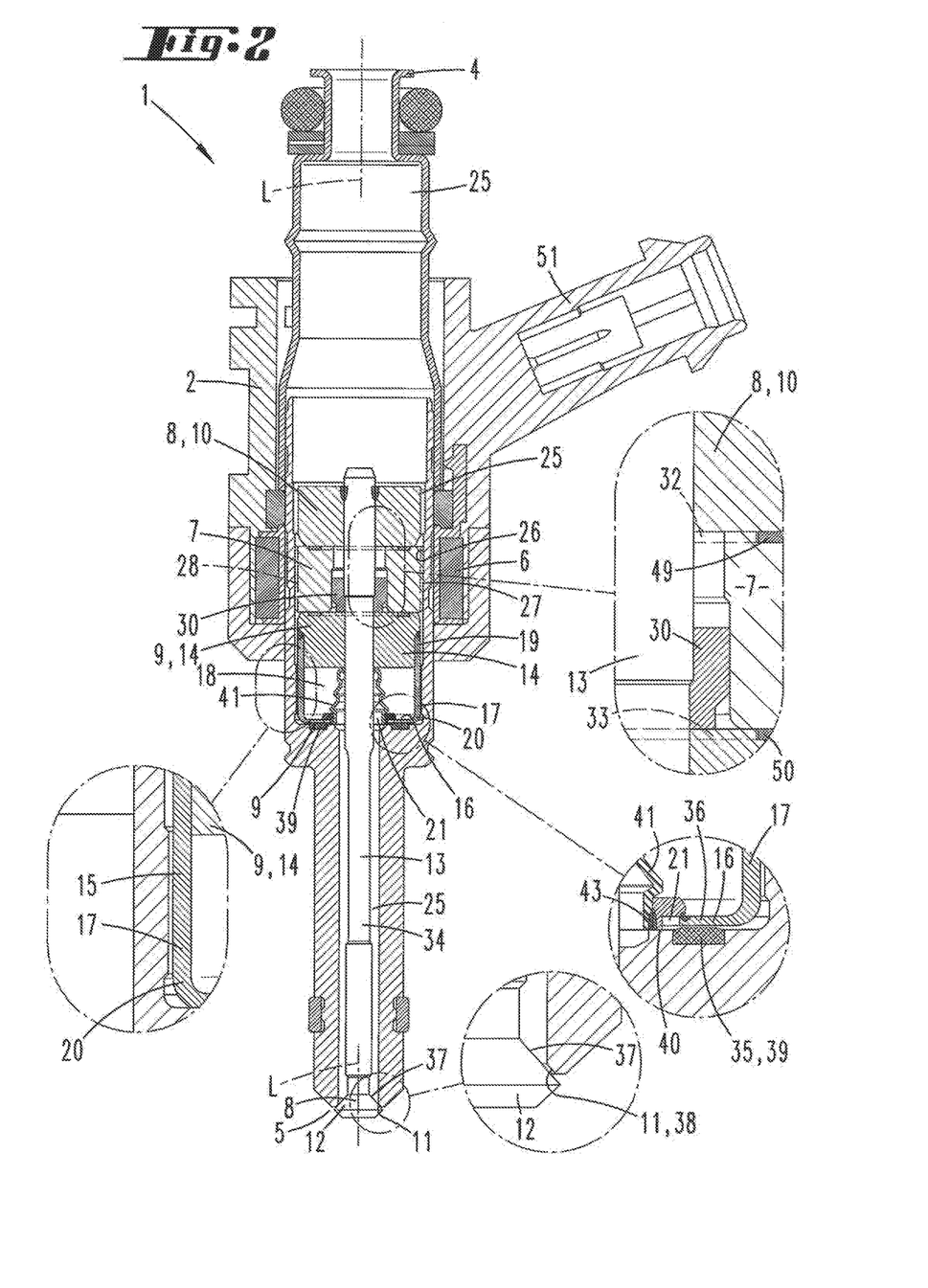
FIG. 2 is a sectional view of the fluid injector of FIG. 1 in an opened operation state for dispensing fuel fluid to a combustion chamber.

On the other hand, FIG. 2 shows another operational state when coil 6 is energized. Consequently, pole piece 7 is magnetized and its magnetic forces attract the first armature 10 and the second armature 14 in opposite directions to the pole piece 7, respectively. If first armature 10 moves towards the pole piece 7, this also results in a movement of the first closing member 12 away from its first sealing seat 11 in an outward direction. In consequence, fluid path 3 is opened at the first valve 8. Furthermore, a movement of second armature 14 in a direction towards the pole piece 7 also results in a movement of the metallic bottom 16 away from the elastomer element 39 (i.e., away from the second sealing seat 35). As a result, the fluid path 3 is opened at the second valve 9.

In summary, in the de-energized state of the coil 6, the first valve 8 and the second valve 9 are closed. On the other hand, in the energized state of coil 6, the first valve 8 and the second valve 9 are both opened.

As shown by FIGS. 1 and 1a, in the de-energized state of the coil 6, there is a first axial gap 47 between the pole piece 7 and the first armature 10 and a second axial gap 48 between the pole piece 7 and the second armature 14.

In FIG. 1b, an intended fluid path 3 and an unintended fluid path 46 are schematically indicated. Further, it is shown by arrows that the bottom 16 of the armature holder 15 provides an active area to keep the second sealing seat 35 closed. The reason is that the inner surface of the bottom 16 which is applied by the pressure is bigger compared to the outer surface of bottom 16 which is outside the elastomer sealing element 39. Accordingly, the shown design, in case of a system failure with too high gas pressure, will support a safe closing function. The elastomeric sealing will be kept closed by the gas pressure because the total force which keeps the sealing tight is higher than the one which could open it generated by the magnetic circuit.

Figure 3:
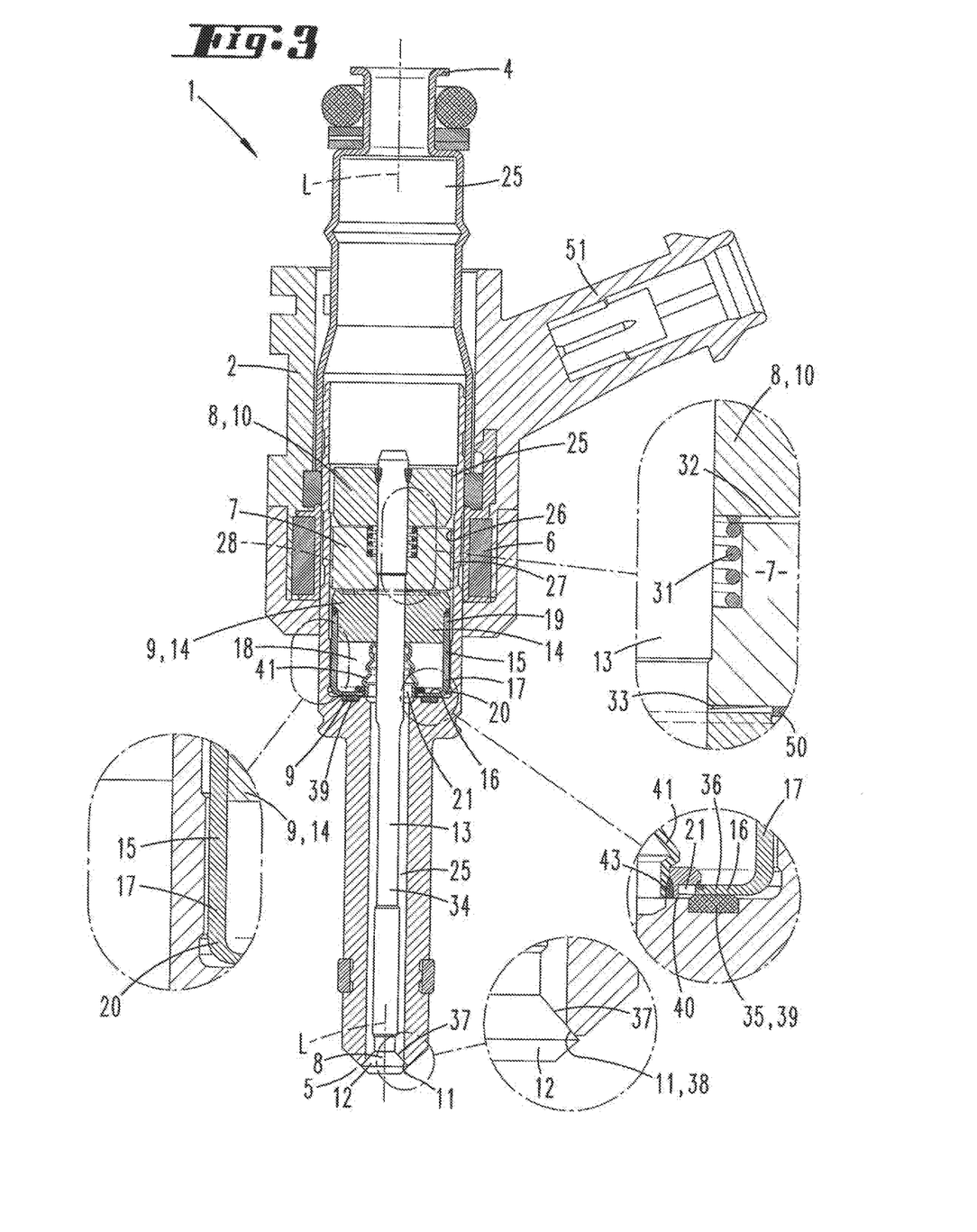
FIG. 3 a sectional view of a second preferred embodiment of a fluid injector in its closed operation state.

A second preferred embodiment of a fluid injector 1 according to the present invention is shown by FIG. 3. For better comparison, features which correspond or which are similar to those of the first embodiment are indicated by the same reference signs. Differing from the first embodiment, the design of pole piece 7 has been changed. Its inner through-hole 23 provides a step. A helical spring 31 is inserted so that its first axial end is retained at the step of the pole piece 7 and so that second axial end is retained at the first armature 10 in order to push armature 10 away from the pole piece 7 in order to open the first valve 8.

The description of the embodiments of the invention is merely exemplary in nature and, thus, variations that do not depart from the gist of the invention are intended to be within the scope of the invention. Such variations are not to be regarded as a departure from the spirit and scope of the invention.

The invention claimed is:

1. A fluid injector for direct injection of compressed natural gas into a combustion chamber of a combustion engine, the fluid injector comprising:
   an injector housing including a fluid path wherein the fluid path extends along a longitudinal direction from an injector inlet to an injector outlet;
   one coil;
   a pole piece;
   a first valve configured to act on the fluid path and comprising a first armature; and
   a second valve configured to act on the fluid path and comprising a second armature,
   wherein the first armature and the second armature are arranged proximate to the pole piece on antipodal sides of the pole piece along the longitudinal direction, and
   wherein the first valve comprises a valve needle, the first armature is axially fixed to the valve needle and the valve needle extends through a central opening of the pole piece and through an opening of the second armature.

2. The fluid injector according to claim 1, wherein the fluid injector is configured to operate the first armature and the second armature by supplying one electrical signal to the one coil.

3. The fluid injector according to claim 1, wherein the first valve is an outward opening valve and the second valve is an inward opening valve.

4. The fluid injector according to claim 1, wherein the first armature is located axially between the injector inlet and the pole piece and the second armature is located axially between the pole piece and the injector outlet.

5. The fluid injector according to claim 1, wherein the first valve comprises an axially compressed spring for pressing the first armature in a direction away from the pole piece.

6. The fluid injector according to claim 1, wherein the second valve comprises an armature holder, the armature holder has a bottom and a wall, the wall extends around a cavity, one axial end of the wall is axially fixed to the second armature and the other axial end of the wall is integrally connected to the bottom, the bottom has a central through-hole, the valve needle extends through the central through-hole, an edge of the central through-hole is connected to the valve needle by an elastic bellow, and the elastic bellow is mounted axially compressed in a sealing manner.

7. The fluid injector according to claim 6, wherein the first valve comprises an axially compressed spring for pressing the first armature in a direction away from the pole piece, and in a de-energized state of the one coil, an amount of a first axial force generated by the axially compressed spring is different from an amount of a second axial force generated by the elastic bellow.

8. The fluid injector according to claim 1, wherein in a de-energized state of the one coil, there is a first axial gap between the pole piece and the first armature and a second axial gap between the pole piece and the second armature, and the first gap has a different axial extension compared to the second gap.

9. A fluid injector for direct injection of compressed natural gas into a combustion chamber of a combustion engine, the fluid injector comprising:
an injector housing including a fluid path wherein the fluid path extends along a longitudinal direction from an injector inlet to an injector outlet;
one coil;
a pole piece;
a first valve configured to act on the fluid path and comprising a first armature; and
a second valve configured to act on the fluid path and comprising a second armature,
wherein the first armature and the second armature are arranged proximate to the pole piece on antipodal sides of the pole piece along the longitudinal direction, and
wherein the first valve comprises a first sealing seat and a first closing member, the first closing member is connected to the first armature, the second valve comprises a second sealing seat and a second closing member, the second closing member is connected to the second armature, the second closing member is disposed upstream to the first closing member in the fluid path and the first closing member is disposed at the injector outlet.

10. The fluid injector according to claim 9, wherein at least one of the first sealing seat and the first closing member is metallic or comprises a metallic element.

11. The fluid injector according to claim 9, wherein at least one of the second sealing seat and the second closing member is elastomeric or comprises an elastomeric element.

12. The fluid injector of claim 9, wherein the first valve is an outward opening valve and the second valve is an inward opening valve.

13. A combustion engine, comprising:
a cylinder having a combustion chamber; and
a fluid injector coupled to the cylinder in a manner capable for direct injection of a fuel fluid into the combustion chamber of the cylinder, the fluid injector comprising:
an injector housing including a fluid path wherein the fluid path extends along a longitudinal axis of the fluid injector from an injector inlet to an injector outlet;
a single coil;
a pole piece;
a first valve configured to act on the fluid path and comprising a first armature; and
a second valve configured to act on the fluid path and comprising a second armature,
wherein the first armature and the second armature are arranged proximate to the pole piece on antipodal sides of the pole piece along the longitudinal axis, and
wherein the first valve comprises a first sealing seat and a first closing member, the first closing member is connected to the first armature, the second valve comprises a second sealing seat and a second closing member, the second closing member is connected to the second armature, the second closing member is disposed upstream to the first closing member in the fluid path and the first closing member is disposed at the injector outlet.

14. The combustion engine according to claim 13, wherein the inlet of the fluid injector is coupled to a fluid source of compressed natural gas such that the fluid injector injects the compressed natural gas directly into the combustion chamber.

15. The combustion engine of claim 13, wherein the first armature and the second armature supply one electrical signal to the single coil.

16. The combustion engine of claim 13, wherein at least one of the second sealing seat and the second closing member is elastomeric or comprises an elastomeric element.

17. The combustion engine of claim 13, wherein the first valve comprises a valve needle, the first armature is axially fixed to the valve needle and the valve needle extends through a central opening of the pole piece and through an opening of the second armature.

18. The combustion engine of claim 17, wherein the second valve comprises an armature holder, the armature holder has a bottom and a wall, the wall extends around a cavity, one axial end of the wall is axially fixed to the second armature and the other axial end of the wall is integrally connected to the bottom, the bottom has a central through-hole, the valve needle extends through the central through-hole, an edge of the central through-hole is connected to the valve needle by an elastic bellow, and the elastic bellow is mounted axially compressed in a sealing manner.

19. The combustion engine of claim 18, wherein the first valve comprises an axially compressed spring for pressing the first armature in a direction away from the pole piece, and in a de-energized state of the one coil, an amount of a first axial force generated by the axially compressed spring is different from an amount of a second axial force generated by the elastic bellow.

20. The combustion engine of claim 13, wherein the first valve is an outward opening valve and the second valve is an inward opening valve.

\* \* \* \* \*